United States Patent [19]
Horn Feja et al.

[11] Patent Number: 6,027,667
[45] Date of Patent: *Feb. 22, 2000

[54] PROCESS AND APPARATUS FOR PRODUCING PHOSPHINE-CONTAINING GAS

[75] Inventors: Franziskus Horn Feja, Santiago, Chile; Christoph Reichmuth, Berlin, Germany

[73] Assignee: Degesch de Chile Ltda, Santiago, Chile

[ * ] Notice: This patent is subject to a terminal disclaimer.

[21] Appl. No.: 08/659,911

[22] Filed: Jun. 7, 1996

[30] Foreign Application Priority Data

Jun. 7, 1995 [GB] United Kingdom .................... 9511495

[51] Int. Cl.[7] ...................................................... C01B 25/06
[52] U.S. Cl. .............................................................. 252/372
[58] Field of Search ............................................... 252/372

[56] References Cited

U.S. PATENT DOCUMENTS 4,814,154  3/1989  Doermmann et al. .
5,573,740  11/1996  Banks et al. .

FOREIGN PATENT DOCUMENTS

| 291897 | 6/1928 | United Kingdom . |
| 472970 | 10/1937 | United Kingdom . |
| 776070 | 6/1957 | United Kingdom . |
| 2062602 | 12/1979 | United Kingdom . |
| 2097775 | 5/1981 | United Kingdom . |
| 9325075 | 12/1993 | WIPO . |

*Primary Examiner*—Michael L. Shippen
*Attorney, Agent, or Firm*—Pillsbury Madison & Sutro LLP

[57] ABSTRACT

A process and apparatus is disclosed for generating a mixture of phosphine and diluent gas(es). A hydrolyzable metal phosphide, preferably magnesium phosphide, is released directly into liquid water under an atmosphere of gas inert to phosphine and in a free-flowing particulate form, composed of loose metal phosphide particles. The generated mixture of phosphine and inert carrier gas, e.g. $CO_2$, is used as such or is diluted into a gas mixing chamber with air to a concentration below the ignitability limit before being used in fumigation. Using argon as a carrier gas the phosphine mixture is suitable for semiconductor doping.

47 Claims, 5 Drawing Sheets

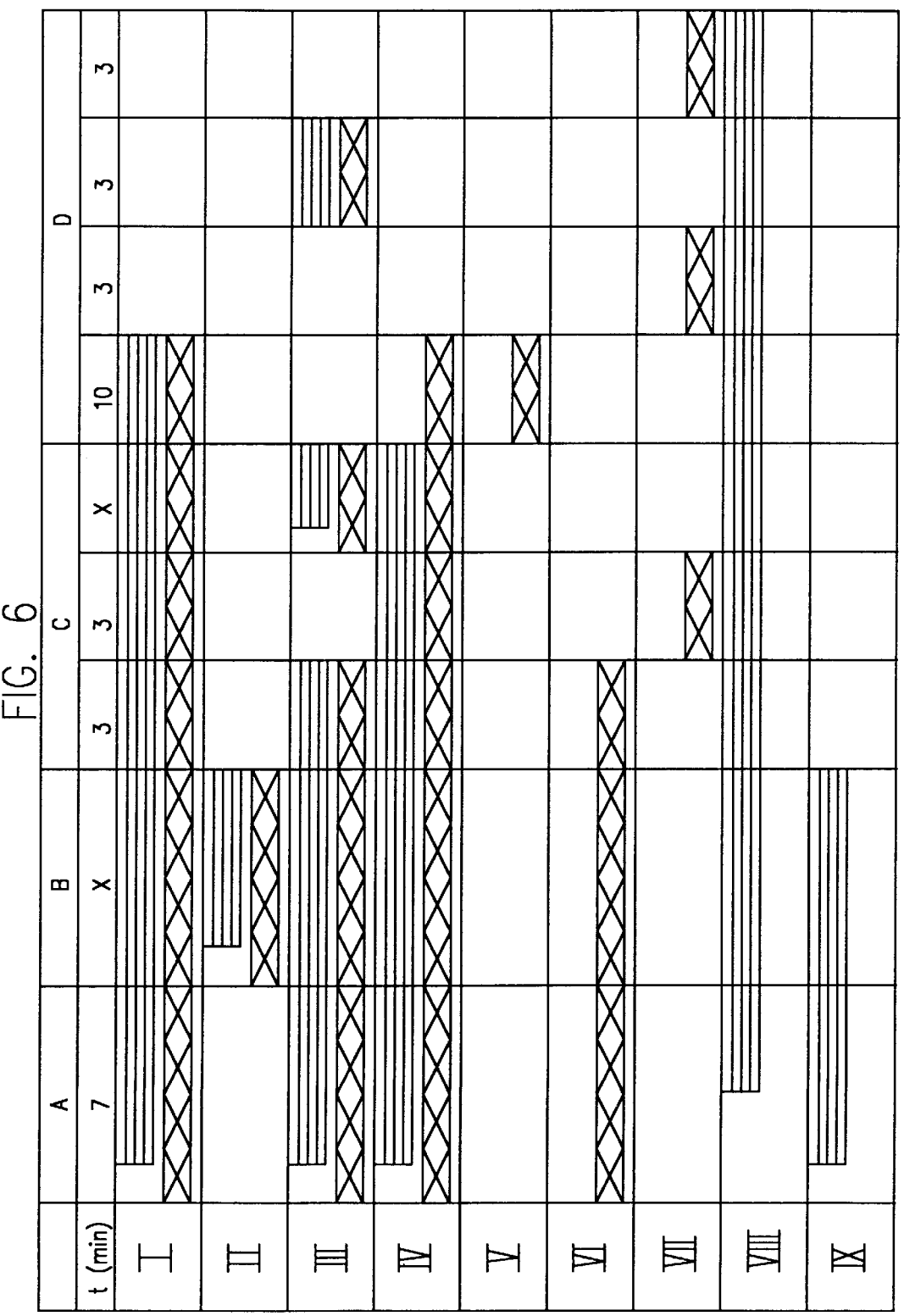

PROCESS AND APPARATUS FOR PRODUCING PHOSPHINE-CONTAINING GAS

BACKGROUND OF THE INVENTION AND PRIOR ART

The present invention relates to a process for generating a mixture of phosphine and diluent gas or gases, wherein a hydrolysable metal phosphide selected from the group consisting of magnesium phosphide, aluminium phosphide and calcium phosphide is contacted with liquid water in a generating space, whereby the metal phosphide is hydrolysed to release phosphine which is withdrawn from the generating space and, where applicable, diluted from the time of its generation to its reaching its locality of use with a diluent gas to a composition which is non-ignitable under the conditions of use. The invention also provides a novel generator suitable for carrying out the process.

Phosphine gas is a highly toxic and flammable gas used in large quantities in pest control, and in particular for the fumigation of agricultural bulk commodities, such as grain and grain products. Phosphine gas generation is also subject to some peculiarities giving rise to special problems which do not apply to the generation by hydrolysis of other gases, e.g. the well-known generation of acetylene gas by hydrolysis of calcium carbide as disclosed e.g. in British patent specifications 472 970 (Haworth), 776,070 (Union Carbide) and 291,997 (Haworth).

In the case of phosphine gas generation there has always been the problem that prior art hydrolysable technical grade metal phosphides contained impurities which on hydrolysis liberated autoignitable phosphine homologues, phosphine derivatives, organophosphines, diphosphines or polyphosphines. This circumstance has created a strong prejudice in the art against what the present application proposes in what follows.

Traditionally compositions containing hydrolysable metal phosphides, in particular aluminium, magnesium and calcium phosphides have been used for this purpose, applied either in sachets or other dispenser devices or as moulded bodies (pellets or tablets).

In either case, the traditional compositions have always been compounded with various additives to a) reduce the reactivity of the metal phosphide when exposed to water in vapour or liquid form and b) to depress their tendency to autoignite. (Rauscher et al U.S. Pat. No. 3,132,067, Friemel et al U.S. Pat. No. 3,372,088, Friemel et al U.S. Pat. Nos. 4,421,742 and 4,725,418, Kapp U.S. Pat. No. 4,347,241). In spite of these expedients, these prior art products remained dangerous substances, involving fire and explosion hazards which had never been fully overcome if the products are handled inexpertly and stringent safety precautions are neglected. The degree of safety also depends on the experience of the manufacturer and quality control. The traditional manner of using these products in bulk commodity fumigation is to introduce the compositions into the storage means (e.g. silos, shipholds) as such. In the case of pellets or tablets, these are usually introduced into the bulk commodity itself. This practice is nowadays criticised because of the resultant contamination of the bulk commodities with the residues of the decomposed tablets or pellets.

If prior art compositions are apportioned in sachets, bag-blankets, bag-chains or similar dispensers, the purpose is to divide the composition into small individual portions in order to reduce the hazards of large local accumulations of gas and heat build up and at the same time prevent direct contact of the compositions with the commodities. These devices must, after completion of the fumigation, be retrieved from the storage or like facility where the fumigation has taken place. This is often difficult and cumbersome. The spent devices must then be disposed of, a matter which nowadays may cause problems.

All these and other prior art fumigation means and their traditional methods of application suffer from the drawback that once the devices have been introduced into the silo or other storage space and once the fumigation has commenced, there is usually very little that can be done to influence or even monitor the further progress of the fumigation. In particular, if the composition should accidentally be deposited in a wet spot inside a grain store, this will neither be noticed in time, nor can the resultant dangerous situation be corrected. A fumigation of this type once commenced, can normally neither be stopped nor (usually) be decelerated or accelerated.

To overcome these shortcomings to some extent new processes have been developed wherein tablets and pellets or the aforesaid sachets, bag-blankets, bag chains or similar dispensers are distributed e.g. on the surface of the bulk commodity and to then apply recirculation of the gas content of the silo, storage space or shiphold; see U.S. Pat. Nos. 4,200,657 (Cook), 4,651,463 and 4,756,117 (Friemel) and 4,853,241 and 4,729,298 (Dörnemann).

In those cases contamination, if any, is more localised and the spent dispensers are more readily retrieved, although these are still inaccessible whilst the process is in progress. The aforesaid climatic and humidity limitations still usually apply. The time taken for achieving a scheduled concentration of phosphine throughout the storage space still depends on the rate at which the metal phosphide composition is hydrolysed under prevailing circumstances. If the applied circulation is too slow or ceases, e.g. due to a power failure, undesirable concentrations of phosphine may accumulate.

It has been recognised that it would be highly advantageous if it were possible to transfer the generation of phosphine gas to a locality outside the fumigation space whereafter the gas could then be fed into the commodity or storage facility in a controlled manner. However, because of the conceived and real risks inherent in phosphine gas and phosphine-releasing compositions, very little real progress has been made in this regard.

Thus the use of bottled $PH_3$, produced by one or other undisclosed industrial process, has been proposed in U.S. Pat. No. 4,889,708. Again, in order to prevent autoignition once the gas is released into air and the mixture of air and gas is used as a fumigant, it was considered necessary to bottle the $PH_3$ highly diluted with an inert carrier gas such as $CO_2$ or $N_2$. According to U.S. Pat. No. 4,889,708, the $PH_3$ concentration in the bottled gas is to be 1.8 to 3% by weight. The storage and transport of this highly diluted phosphine gas involves considerable logistics problems, besides being very expensive.

It also involves the grave risk that in the event of an accident on site, in transport or in storage or in the event of leaking bottles, e.g. due to defective or not properly closed valves, a gas cloud, albeit not readily flammable, is formed which is highly toxic and which, because it is heavier than air, can accumulate in low-lying areas or in cellars or the like.

U.S. Pat. No. 5,098,664 discloses a recent attempt to overcome the prejudice existing in the art against the generation of phosphine gas in an external generator apparatus, wherein relatively large concentrated batches of metal phosphide are hydrolysed by the passage therethrough of controlled amounts of water vapour dispersed in humid air, the air serving as a carrier gas. This proposal still suffers from certain potential shortcomings. That disclosure teaches interrupting the hydrolysis in the event of operational failures by displacing the humid air in the generator space by an inert fluid, (liquid or gas). The recirculation type of process has similarly been improved in accordance with European patent application 9 114 856.8 (Degesch GmbH; published after the priority date of the present application) in that the hydrolysis of the solid metal phosphide compositions takes place outside the space containing the commodities to be fumigated in a hydrolysis chamber through which the circulatory gas flow is passed. Again, in the event of problems necessitating the interruption of gas generation, inert gas is admitted into the hydrolysis chamber to displace the humid air. In both the aforesaid cases there can be a considerable delay before humidity which has already partly reacted with the metal phosphide is fully consumed so that no further generation of phosphine takes place. This prolonged delayed release of phosphine can be explained by the following reactions. Normally the following reaction predominates when magnesium phosphide is exposed to humidity:

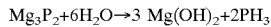

$$Mg_3P_2 + 6H_2O \rightarrow 3\ Mg(OH)_2 + 2PH_3$$

However, if the admission of humidity is interrupted, the already formed magnesium hydroxide continues to react with not yet hydrolysed magnesium phosphide as follows:

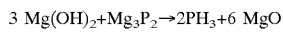

$$3\ Mg(OH)_2 + Mg_3P_2 \rightarrow 2PH_3 + 6\ MgO$$

This latter reaction, because of the solid nature of the reactants, is slow and continues over a prolonged period. The above phenomenon also applies to other metal phosphides, e.g. aluminium phosphide.

Complete control of all aspects of the aforesaid generator and process is nevertheless feasible but is complex and expensive.

A number of more recent similar proposals are disclosed in PCT application WO 91/19671. Some embodiments again involve reaction of metal phosphide compositions with water vapour, and these embodiments are subject to the abovementioned problems. In most embodiments the phosphine is released into air, and the risk of ignitable mixtures of phosphine and air being formed cannot be excluded.

In some other embodiments prior art tablets (as described further above) are dropped periodically one by one at a controlled rate into a water bath inside a generating space. The compositions, being in the form of compressed bodies, namely tablets, are specially compounded to reduce their reactivity. These tablets take a relatively long time to decompose when dropped into water, even if the water is heated, as proposed in this prior art. Accordingly this prior art process and apparatus suffers from the drawback that the gas generation is relatively slow and can only be accelerated by increasing the rate of feeding tablets into the water. This in turn means that the amount of metal phosphide submerged in the water bath at any one time is relatively large, and accordingly, if it becomes necessary to stop the gas generation because of some operational failure, it will take a long time before the gas generation stops, and large volumes of phosphine gas are generated during that period which have to be disposed of in some way or another. In most embodiments the phosphine is released into air and the risk of ignitable mixtures of phosphine and air being formed cannot be excluded. In addition, the gases released by such prior art composition, when dropped into water have a greater or lesser tendency to autoignite.

Moreover the prior art compositions used in that process release paraffin wax or other hydrophobic and other additives into the water bath. The hydrophobic contaminants in particular float on the water surface and interfere with the smooth progress of the process by forming emulsions and entrapping metal phosphide particles and generally contaminate the water in the apparatus and the apparatus itself, causing a disposal and cleaning problem. These problems also arise from the proposals in PCT application WO 93 25075 wherein an extrudable paste of the metal phosphide and a water-immiscible, grease-like substance is squeezed into water in a generator space.

Accordingly there exists a need for a process and apparatus of the type set out in the aforegoing which does not suffer from the aforesaid disadvantages or wherein these disadvantages are substantially mitigated. In particular there exists a need for a process and apparatus permitting the safe production of phosphine-containing gases in an environmentally friendly manner, with a minimum of disposal problems of potentially harmful metal phosphide residues and/or oily or greasy contaminants. Such process and apparatus should also be easily controllable in the case of operational failures, e.g. electrical power failures, and may indeed in certain embodiments be operable independently or substantially independently of any external electrical power supply.

There also exists a need for a metal phosphide composition suitable for carrying out the process and which will deliver a phosphine gas having no or no appreciable tendency to autoignite.

The aforesaid prior art compositions suffered from the disadvantage that the phosphine gas released therefrom on hydrolysis has a greater or lesser tendency to autoignite. This problem has been linked to the hitherto unavoidable presence in the metal phosphide of contaminants which on hydrolysis liberate autoignitable phosphine homologues, phosphine derivatives, organophosphines, diphosphine or polyphosphines. Because the presence of these contaminants was considered unavoidable, the incorporation of the additives in accordance with the above cited prior art was considered unavoidable. In addition, the aforesaid forms of presentation as pressed bodies or in dispensers such as sachets were intended to slow down greatly the hydrolysis reaction, to avoid heat build-up and build-up of ignitable or explosive gas accumulations and concentrations.

U.S. Pat. Nos. 4,331,642 and 4,412,979 to Horn et al and UK patent application 2097775 by Degesch GmbH disclose a process purported to result in the formation of magnesium phosphide free of such contaminants by the reaction of magnesium and yellow phosphorus at a temperature between 300° and 600° C. In spite of these claims, it was considered necessary to compound this magnesium phosphide with large amounts of additives and resinous binder in the form of so-called "plates" as described in German patent 2002655.

This material has, in the past, invariably been phlegmatised immediately after its formation by impregnation and coating with a hydrophobic substance, preferably hard paraffin in amounts of about 1 to 4%, preferably 2 to 3.5%, before any further handling or before storage prior to use in the manufacture of compositions for pest control purposes, such as the aforesaid "plates". For the aforesaid reasons the pure metal phosphide, such as the highly reactive magnesium phosphide, in its unphlegmatised form was never as such in the past made available to the public.

Although these plates have been very successful commercially and play an important role in the art, they have to be handled with the same great care as other conventional metal phosphide preparations, inter alia because of the risk of autoignition on contact with liquid water, for hitherto unknown reasons.

GENERAL DESCRIPTION OF THE INVENTION

According to one aspect of the present invention a process is provided as set out in the introductory paragraph, wherein the metal phosphide is released into the liquid water in a free-flowing particulate form, composed of loose metal phosphide particles, essentially free of metal phosphide dust and of hydrolysis retarding agents and essentially free of hydrophobic substance in the form of coatings or hydrophobising additives, and, in the event that dilution commences already in the generating space, under an atmosphere comprising a carrier gas inert to the phosphine, forming at least part of the diluent gas.

Preferably dilution commences already in the generating space and the carrier gas inert to the phosphine is also inert to the metal phosphide and the metal phosphide is maintained in an atmosphere of said carrier gas before entering the water.

As a further preferred safety feature the metal phosphide is essentially free of impurities giving rise to autoignition, including impurities which on hydrolysis in the process liberate autoignitable phosphine homologues, phosphine derivatives, organophosphines, diphosphine or polyphosphines.

The present invention had to overcome several serious prejudices existing in the art, based on problems real or conceived. The invention provides a number of safety features which each, taken alone constitute a great improvement over the prior art and which are preferably used in combination.

The metal phosphide composition used in the process is considered novel per se and forms the subject of our copending application Ser. No. 08/659,916 of even date, entitled "Compositions for producing phosphine-containing gas.

Thus, it has now surprisingly been found possible to provide a metal phosphide composition for the production of phosphine by hydrolysis, comprising solid particles of metal phosphide selected from the group consisting of aluminium phosphide, calcium phosphide and magnesium phosphide and mixtures of these, free of impurities, which on hydrolysis liberate autoignitable phosphine homologues, phosphine derivatives, organophosphines, diphosphine or polyphosphines, in the form of a free-flowing powder essentially free of metal phosphide dust, essentially free of hydrolysis retarding agents and essentially free of hydrophobic substance in the form of coatings or additives, which surprisingly can be used to produce phosphine gas safely by exposure to liquid water.

Because of the nature of the novel metal phosphide composition being used in the preferred process, the phosphine formed is free of autoigniting contaminants, and the gas mixture formed was found to have no tendency to autoignite, even when released into air in such amounts that the concentration of the phosphine in air exceeds the ignition limit as known for mixtures of air and phosphine. Moreover, because in the preferred process a carrier gas is selected which is inert to the phosphine and preferably nonflammable, the gas mixture as such is quite safe.

Thus, according to one aspect of the present invention, a process is provided as set out in the opening paragraph, wherein the metal phosphide is released into the liquid water in a free-flowing particulate form, composed of loose metal phosphide particles, essentially free of metal phosphide dust and of hydrolysis retarding agents and essentially free of hydrophobic substance in the form of coatings or hydrophobising additives and under an atmosphere comprising a carrier gas inert to the phosphine, forming at least part of the diluent gas. Preferably the carrier gas inert to the phosphine is also inert to the metal phosphide and the metal phosphide is maintained in an atmosphere of said carrier gas before entering the water. Also, preferably the metal phosphide is essentially free of impurities giving rise to autoignition, including impurities, which on hydrolysis in the process liberate autoignitable phosphine homologues, phosphine derivatives, organophosphines, diphosphine or polyphosphines.

An advantageous feature is that the particulate metal phosphide released into the water, because of its small particle size, high reactivity and the absence of reaction retarding additives, in particular an absence of hydrophobic coatings, sinks in the water, becomes wholly submerged and hydrolyses almost immediately, and in any event in less than 3 minutes, preferably less than 1 minute. Indeed, using magnesium phosphide, the hydrolysis is normally complete within a few seconds.

If the particles are relatively large or have a relatively moderate reactivity as in the case of aluminium phosphide the rate of hydrolysis is preferably accelerated by acidifying the water, e.g. with 5% HCl or rendering it alkaline. This may be preferred to heating the water as disclosed in the aforesaid PCT application WO 91/19671. In fact, cooling and/or recirculation of the water may sometimes be resorted to, to prevent undesirable rises in temperature. The reason is that at high temperature the water evaporates more rapidly, sometimes resulting in an undesirable moisture content of the generated gas mixture. In such cases, the temperature of the water is preferably maintained at below 60° C. More preferably the temperature of the water is regulated to from 3 to 40° C.

On the other hand, if moisture in the gas is not objectionable, heating and/or a build-up of reaction heat may be resorted to in order to accelerate the hydrolysis. Indeed, because the hydrolysis takes place under an inert atmosphere, it was found to be quite safe to allow the water temperature to rise to near the boiling temperature, preferably to up to about 75%.

Preferably the water is also agitated with the carrier gas.

The process is preferably carried out with the above-described embodiment of the metal phosphide composition which is sealed in a gastight dispenser container. In that case, preferably, the metal phosphide powder of the composition after having been discharged from the container is entrained in the carrier gas and thus entrained is carried into the generator space and there enters into the water. For example, the contents of the dispenser container are introduced into the water in from 30 minutes to 30 hours.

The process is preferably carried out with a specially designed generator apparatus according to the invention to be described further below.

It is an important advantage of the invention that the nature of the carrier gas as well as the ratio of phosphine to carrier gas can be selected within wide limits to suit a desired purpose. In practice, a convenient upper limit has been about 75% v/v phosphine gas.

Particularly if the gas mixture is to be used for fumigation purposes and depending on the conditions of the fumigation process the metal phosphide composition may, for example, be introduced into the water at a rate adapted to the rate of admission of carrier gas and the rate of withdrawal of the mixture to produce said mixture in a ratio of from about 40:60 to 3:95 by volume of phosphine:carrier gas. Preferably said ratio is from 30:60 to 5:93, more particularly from 17:82 to 10:90, e.g. 13:87. For some purposes a ratio of not more than 8:92 is preferred, because such mixture will no longer support a flame in an ordinary air atmosphere.

In such uses as in fumigation the carrier gas is preferably non-flammable.

Preferably the carrier gas inert to phosphine is selected from the group consisting of $CO_2$, argon, helium, nitrogen, ammonia, methylbromide, freon and halon gases and mixtures of two or more of these. For fumigation purposes nitrogen or $CO_2$, particularly the latter, are particularly preferred, inter alia because $CO_2$ synergistically enhances the effectiveness of $PH_3$ as a fumigant. Moreover, being weakly acidic, $CO_2$ in the process according to the invention offers the further advantage that it accelerates the hydrolysis of the metal phosphide.

For purposes where the gas mixture is to be heavier than air, optional carrier gases heavier than air may be used. Where flammability is not an obstacle, such carrier gases may, for example, include hydrocarbon gases heavier than air such as propane and butane and their isomers. For special purposes a gas lighter than air such as helium, methane or hydrogen may be employed, although in the latter two cases special precautions against fire and explosion hazards need to be taken, so that helium is generally preferred.

The phosphine produced in accordance with the invention may be so pure that it can be used for semiconductor doping. In that case the preferred carrier gas is argon.

In certain circumstances it may be necessary to limit the phosphine concentration so as not to exceed 2.4% v/v, which was found to be the limit up to which phosphine cannot be ignited in air under conditions considerably more stringent than those to be expected in practice.

According to preferred embodiments of the process, great savings of inert gas may be achieved and risks of operating with high concentrations of phosphine gas may be further reduced, in that the mixture of phosphine gas and carrier gas inert to phosphine, withdrawn from the generator space, is mixed with air in a ratio of phosphine to air below the ignition limit of phosphine in a mixing space isolated from the environment and upstream of a feed duct for the mixture.

As a further safety feature, the mixing space is preferably temperature monitored, so that the admission of phosphine gas to the mixing space may be interrupted, preferably automatically in the event of a predetermined temperature limit being exceeded.

In the preferred process, water from the generator space is withdrawn and forwarded into an aerating space and air is bubbled through the water in the aerating space and from there is forwarded into the mixing space and mixed there with the phosphine gas and, where applicable, the mixture of phosphine gas and carrier gas inert to phosphine to form said non-ignitable mixture.

Preferably the air is withdrawn from a closed fumigation space wherein fumigation is to take place and the non-ignitable mixture is fed into the fumigation space.

In arriving at these embodiments the inventors had to overcome great prior art prejudices arising from the fire hazards perceived to arise from high concentrations of phosphine gas. However, surprisingly, when testing these embodiments under extreme conditions which could not realistically occur in practice, even when producing phosphine concentrations in $CO_2$ in the generating space as high as 300 000 ppm, feeding such phosphine mixture into the mixing chamber and then reducing the admission of air to the mixing chamber so much that the ignition limit for phosphine was greatly exceeded (a situation which, as will be described further below, is normally prevented by a number of safety features), and then artificially igniting the gas mixture in the feed duct, leading to the fumigation space, the flame on reaching the mixing space was rapidly extinguished, when the thermal monitoring means caused a shut-off of the phosphine supply. In a more extreme test, involving prolonged failure of the temperature monitoring means as well, the fire in the mixing chamber continued without doing any harm, because the feed duct made of plastics melted off, thereby interrupting the communication between the mixing chamber and the fumigating space.

The gas mixture may be introduced into a fumigating space containing a commodity to be fumigated with phosphine, where the phosphine is diluted by the atmosphere in that space to suitable concentration levels. In a preferred fumigation process the gas in the fumigating space, including the mixture is recirculated. More particularly the commodity is a bulk commodity and the gas recirculation is performed through the bulk commodity.

Preferably the bulk commodity is a heaped particulate agricultural or forestry commodity.

More particularly the bulk commodity is a commodity selected from the group consisting of grain, beans, peas, lentils, oil seeds, soya beans, nuts, coffee beans, tea, any of the aforegoing in comminuted, granulated, pelleted or flaked form, milling products of agricultural commodities, particulate or pelleted animal feeds, wood in a particulate form, animal or fish meal, bone meal, bark in a particulate form, cotton, cotton lint, dried fruit, dehydrated vegetables, spices, sago, farinaceous products and confectionery.

The gas mixture may also be employed in the so-called SIROFLOW process, developed by the CSIRO in Australia. (R G Winks, "The Effect of Phosphine on Resistant Insects", GASGA Seminar on Fumigation Technology, Tropical Development and Research Institute, Storage Department, Slough Mar. 18–21, 1986 and R G Winks "Flow-Trough Phosphine Fumigation—A New Technique", Stored Grain Protection Conference, 1983 Section 5.1; WO 91/00017 (CSIRO)).

This invention has also been found to be very useful for space fumigation, e.g. of storage sheds, but in particular of grain mills and factories e.g. for the manufacture of farinaceous products, e.g. noodles and other kinds of pasta. In such cases the mixture of phosphine and carrier gas, which preferably consists of inert gas, e.g. $CO_2$ used in carrying out the hydrolysis with liquid water diluted with air to attain a phosphine concentration not exceeding 2.4% v/v, a concentration of about 18000 ppm (parts per million) being preferred, is introduced from the generator into the space and distributed there by piping, preferably including an appropriate number and configuration of branch pipes leading to various parts, and where applicable different levels of the space(s) to be fumigated.

For carrying out the process the invention provides a phosphine generator which comprises a phosphine generating chamber containing liquid water, optionally and preferably an inlet connected or adapted to be connected to a supply of a gas inert to phosphine and for introducing an atmosphere of said gas into the phosphine generating chamber, an inlet for admitting a hydrolysable metal phosphide composition into the water in the generating chamber, a gas outlet adapted to discharge the phosphine and, where applicable, a mixture of the phosphine and gas inert thereto from the generating chamber and feed means adapted for feeding the metal phosphide through the inlet at a controlled rate, characterized in that the feed means is adapted to feed said metal phosphide in a free-flowing particulate form, composed of loose metal phosphide particles. This generator is designed to use the free-flowing metal phosphide composition according to the invention, to be dealt with more fully further below.

Preferably the feed means operates in a gas atmosphere which is inert to the metal phosphide composition and the phosphine gas and the phosphine generating chamber contains an atmosphere which is inert to phosphine. Also preferably the phosphine generator comprises a gas inlet connected or adapted to be connected to a source of gas inert to phosphine and leading into the water inside the generator space, causing agitation of the water and contributing to the gas content of the mixture of gas and phosphine discharged through the gas outlet.

Advantageously the phosphine generating chamber comprises a partition reaching downwards to the liquid water and separating a portion of a gas space above the liquid water, including said inlet for admitting the metal phosphide composition, from the remainder of said gas space which remainder includes said gas outlet.

In a particular embodiment the outlet adapted to discharge the mixture of the phosphine gas and gas inert thereto is connected downstream thereof to a gas mixing chamber having an air inlet connected to a source of air, the mixing chamber in turn having a discharge outlet adapted to feeding a non-ignitable mixture of air, phosphine and gas inert to phosphine, produced in the mixing chamber, into a gas mixture supply duct.

Preferably the phosphine generating chamber has a water inlet connected to a supply of water and a water outlet discharging into a phosphine stripping vessel equipped with aerating means supplied with air from said source of air and having an air outlet leading into the mixing chamber. This embodiment preferably comprises a gas propulsion means connected to supply the air for the gas mixing chamber. Preferably the gas propulsion means is connected to withdraw air from a space to be fumigated and the discharge passage from the gas mixing chamber feeds into that space.

As an effective safety feature the mixing chamber includes temperature monitoring means, preferably connected to automatically interrupt the supply of phosphine gas to the mixing chamber in the event of a predetermined temperature being exceeded in the mixing chamber.

In the preferred embodiment the feed means includes a pneumatic entrainment device for the particulate composition operated with the moisture-free carrier gas, serving as a propellant gas.

The preferred apparatus includes water disentrainment means adapted to disentrain liquid water from gases emanating from water contained in the generator and returning the water thus disentrained.

In order to feed the free-flowing particulate metal phosphide composition into the water, a particularly advantageous embodiment provides that the feed means includes a pneumatic entrainment device for the particulate composition operated with the moisture-free diluent gas, serving as a carrier and propellant gas. More particularly the pneumatic entrainment device includes a receptacle for the particulate composition, a gas inlet in its bottom region for the carrier gas leading to a venturi device, followed by a powder forwarding duct leading to the inlet for admitting the metal phosphide composition into the water. Advantageously the forwarding duct includes a powder feed rate regulator device.

In a preferred embodiment the said feed means includes:
a) a gastight closed supply vessel for holding a supply of the free-flowing particulate metal phosphide;
b) inside the supply vessel a riser tube, the bottom end of which is open near the bottom of the supply vessel and faces a venturi nozzle connected or adapted to be connected to a propellant gas supply inert to the metal phosphide;
c) a bend remote from the inlet end of the riser tube, leading by way of a duct outside the supply vessel;
d) an aperture at the beginning of and through the outer periphery of the bend inside the supply vessel and in axial alignment with the riser tube.

The size of the aperture may be fixed. However, in order to adjust the feed rate of particulate material, the size of the aperture is adjustable.

Also preferably the bend or duct includes a stop valve which automatically closes in response to an interruption in the propellant gas supply. This is an important safety feature.

In order to minimise contact of the metal phosphide with the atmosphere during its transfer into the apparatus the feed means includes a powder inlet adapted to have connected thereto a sealed prepacked container, containing a supply of the particulate metal phosphide and an opener device is provided for opening the container, when connected.

At the end of a fumigation or after a certain amount of metal phosphide composition has been hydrolysed, the hydrolysis chamber and, where applicable, the aeration chamber needs to be cleaned in order to remove insoluble residues such as metallic magnesium and magnesium carbonate. For that purpose the apparatus may comprise a feed device for admitting a cleaning agent into the generator chamber. The cleaning agent may be hydrochloric acid. The preferred apparatus may comprise fully automatic means for draining spent water and sludge therefrom, for introducing the cleaning agent and for subjecting the apparatus to a predetermined cleaning and rinsing programme.

According to a further aspect of the invention the preferred apparatus may also be defined as a phosphine generator for producing a mixture of phosphine and diluent gas including air which includes
a) a phosphine hydrolysis chamber, wherein metal phosphide is hydrolysed under an atmosphere of gas inert to phosphine to result in a mixture containing a concentration of phosphine which is ignitable when brought into contact with air;
b) a gas mixing chamber connected downstream of a) but otherwise separate from a) and also separate from the environment, having an air inlet connected to a source of air and an outlet connected or adapted to be connected to a duct for feeding a gas mixture produced in the mixing chamber into a fumigation space; and
c) regulating means adapted to adjust the ratio of phosphine to and, where applicable, further gas or gases in the gas mixing chamber b) to a value at which such mixture of gases produced in the mixing chamber is non-ignitable.

The apparatus preferably comprises means for automatically interrupting the supply of phosphine to the gas mixing chamber in response to an operational failure. Preferably said means for automatically interrupting include temperature monitoring means responsive to an excessive temperature in the gas mixing chamber. In addition or alternatively said means for automatically interrupting include means responsive to an operational failure in the supply of air to the gas mixing chamber and/or in the supply of gas inert to phosphine to the hydrolysis chamber and/or in the means for feeding metal phosphide into the hydrolysis chamber and/or in a supply of water to the hydrolysis chamber.

As for the remainder all the various features of the phosphine generator described above are preferably incorporated.

The above apparatus was found to offer considerable advantages over the prior art. Because of the free-flowing nature of the metal phosphide it is possible to feed the metal phosphide accurately at the desired rate and in a form wherein it is hydrolysed and releases phosphine almost immediately. The feed means is completely isolated from moisture and before the metal phosphide enters the phosphine generating chamber it is maintained in a completely inert, moisture-free environment. The moment the propellant gas supply is interrupted—intentionally or otherwise—the feeding of metal phosphide composition is interrupted and the metal phosphide inside the feed device is isolated from the generating space. Because of the small amount of metal phosphide present in the water at any one time and the very rapid hydrolysis thereof, the generation of phosphine ceases almost immediately. The relatively small amount of phosphine still formed is present in the form of a safe mixture with the inert carrier gas, which, because of the small amount, can either be vented off, or better still, can be fed to wherever it is to be used, e.g. into the fumigation space. In that case this phosphine is not lost due to the interruption.

The technical success of the phosphine generating process and apparatus according to the invention is closely linked to and based on the invention of a suitable metal phosphide composition for the production of phosphine by hydrolysis, comprising solid particles of metal phosphide selected from the group consisting of magnesium phosphide, aluminium phosphide and calcium phosphide and mixtures of these. As explained in the introduction hereof a number of such compositions have been known and used in various forms. Differing from that prior art, the present invention provides that the composition is presented ready for use in a hydrolysis process or apparatus as claimed in any one or more of the claims in the form of a free-flowing particulate metal phosphide material composed of loose particles of said metal phosphide essentially free of metal phosphide dust, essentially free of hydrolysis retarding agents and essentially free of hydrophobic substances in the form of coatings or hydrophobising additives.

More particularly a composition is provided which is essentially free of impurities giving rise to autoignition, including impurities which on hydrolysis liberate autoignitable phosphine homologues, phosphine derivatives, organophosphines, diphosphine or polyphosphines.

Preferably the particles contain more than 90%, preferably not less than 95% by weight pure metal phosphide.

The composition may include a substance enhancing the free-flowing characteristics, which, however, should not be hydrophobic, at least not to any material extent. Preferably, the substance enhancing free-flowing characteristics is graphite dust in an amount of from about 0.1% by weight upwards, preferably up to 0.5% by weight.

The preferred metal phosphide is essentially magnesium phosphide, more particularly produced from magnesium and yellow phosphorus at a temperature of from 350 to 550° C., throughout the reaction batch and more specifically in the manufacture of which care is taken that the temperature nowhere exceeds from 450 to 550° C. Surprisingly it was found that if these conditions are meticulously observed in a manufacturing process otherwise substantially as described in U.S. Pat. Nos. 4,331,642 and 4,412,979 and UK patent application 2097775 and contamination with the additives conventionally used in prior art manufactures of metal phosphide compositions, in particular the usual hydrophobic substances, is avoided, there is obtained a metal phosphide essentially free of contaminants which on hydrolysis create an autoignition hazard. This is particularly so if, in the case of magnesium phosphide, the reaction mixture at the end of the main reaction is subjected to tempering treatment at 530–550° C., preferably substantially at 550° C. (i.e. just below the melting point of the phosphide) for 20 minutes to 3 hours, preferably about 1 hour in order for any unreacted phosphorus to become wholly reacted. When following the procedures described in UK patent application 2097775 without the aforesaid tempering treatment, traces of unreacted phosphorus are still likely to be present in the final product.

In this context it is pointed out that the prior art metal phosphide, e.g. as produced in accordance with the aforesaid references, is always, in normal conventional manufacture, impregnated with a hydrophobic substance, usually about 3.5% molten paraffin wax, immediately after leaving the reactor and whilst still hot, in order to reduce the reactivity of the metal phosphide and render it safer to handle, or so it was believed.

On the basis of prior art knowledge there exists no ready explanation why the metal phosphide composition according to the invention and prepared in the absence of prior art hydrophobic coating substances should be even safer for purposes of the present invention than the prior art products impregnated with paraffin wax.

However, in the light of the new, quite unexpected findings, it appears conceivable that contaminants which on hydrolysis give rise to autoignitable phosphorus compounds may be formed during the impregnation by some unknown reaction between the hot metal phosphide and the hydrophobic substance.

The preferred composition is composed of particles of which more than 90% by weight are in the particle size range of from 0.1 to 2.5 mm, preferably elongate particles having a length of about 0.8–1.4 mm and a thickness in the range of 0.1–0.3, say 0.2 mm. More particularly the manufacture is so controlled that the particles are composed of magnesium phosphide granules as directly formed in the magnesium phosphide production process, i.e. from magnesium particles having substantially the same particle dimensions. This offers the advantage that no milling is necessary which, apart from the costs and wear and tear involved, would give rise to undesirable dust formation.

The composition is preferably sealed in a gastight dispenser container and preferably the gastight container contains an atmosphere of carrier gas inert to the metal phosphide. More particularly the container has a connection locality designed to be connected to a phosphine generator and said connection locality includes a region which, when opened, and after having been connected, releases the composition into the generator. Preferably the interior of the container tapers towards the said region in a funnel-like manner.

The fact that the metal phosphide, in contrast to all prior art metal phosphide compositions, in particular pest control compositions, does not have to contain the usual additives, helps to avoid the introduction of moisture into the container which conventionally gives rise to undesirable phosphine release during storage. Accordingly the compositions according to the invention have excellent storage characteristics.

Because of the nature of the metal phosphide composition, pollution and waste disposal is non-problematic. The metal phosphide, being substantially additive-free, decomposes substantially entirely, leaving behind only a harmless metal hydroxide residue which by the $CO_2$ is converted into carbonate in the form of an environmentally harmless sludge, which can be drawn off from time to time.

In the following the invention will be further described by way of example, partly with reference to the drawings.

BRIEF DESCRIPTION OF THE DRAWINGS

In the drawings:

FIG. 6 represents a diagrammatic time schedule of a complete programme for the process according to the invention.

DETAILED DESCRIPTION OF SPECIFIC EMBODIMENTS OF THE INVENTION

The description that follows should be read in conjunction with the above general description of the invention.

Figure 1:
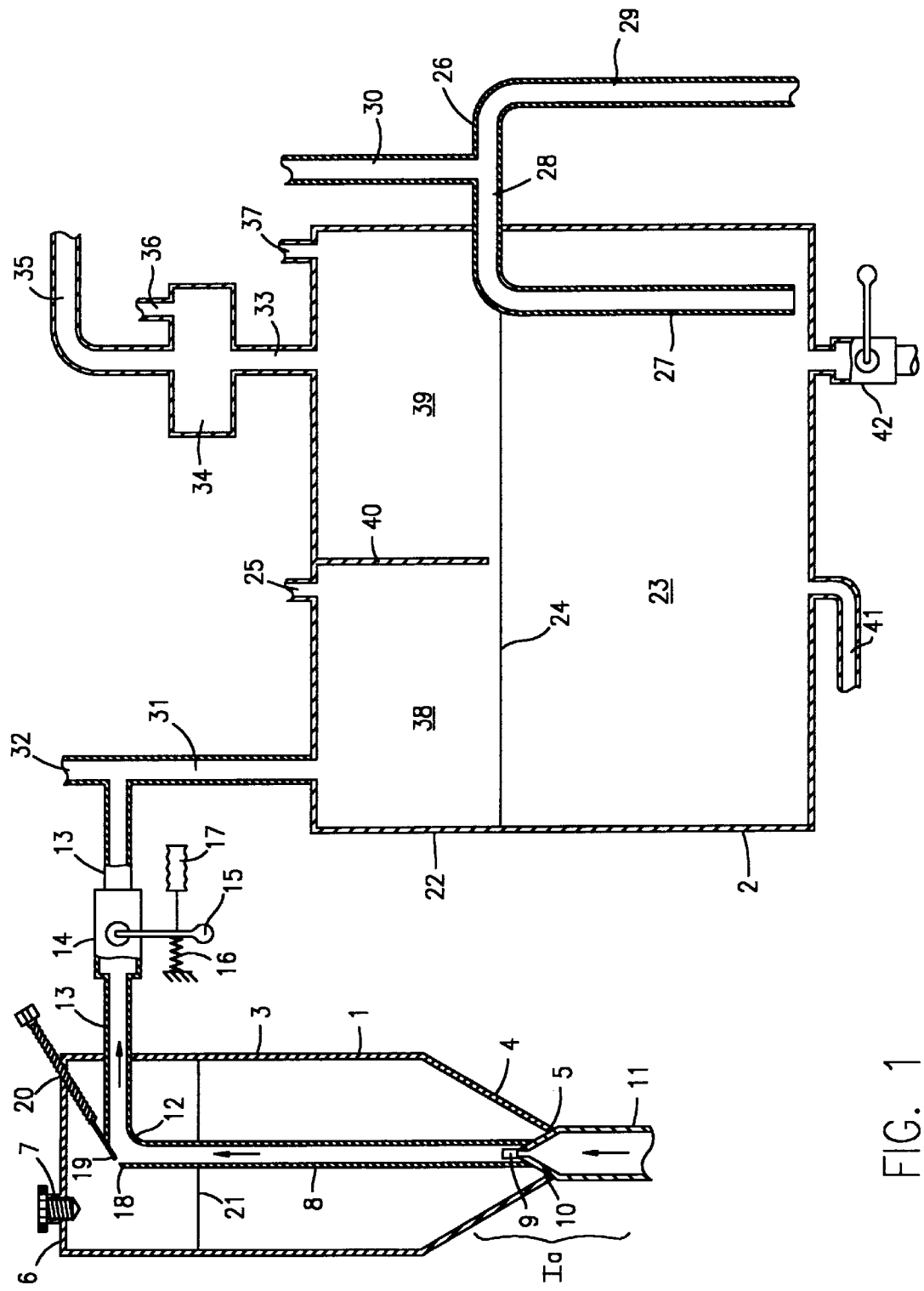
FIG. 1 represents a diagrammatic vertical section of a phosphine generator according to the invention.

Referring now to FIG. 1 of the drawings, the apparatus may be considered as comprising basically two parts. On the lefthand side, generally denoted as 1 there is provided an apparatus 1 for feeding at a controlled rate a free-flowing particulate material, namely in the present instance the free-flowing metal phosphide material. On the righthand side there is shown the gas generator vessel proper generally denoted as 2.

Dealing now first with the apparatus for feeding the metal phosphide, this includes a gastight closed supply vessel 3, the bottom 4 of which is funnel-shaped, terminating in an apex 5 and which contains a bed of particulate material. The top 6 of the supply vessel includes a feed inlet 7, closable in a gastight manner.

Inside the supply vessel, starting from close to the apex 5 and rising vertically near the centre line of the vessel, a riser tube 8 is provided, its lower end near the apex 5 being open at its inlet region through apertures 9 to the supply vessel and facing a venturi nozzle 10 which is vertically upwardly directed into the riser tube 8 and forms the end of a propellant gas supply tube 11 passing through the apex 5 and leading to a propellant gas supply, not shown, for example a carbon dioxide bottle. In use the inlet region is immersed in the bed of particulate material.

Shortly underneath the top 6 of the supply vessel the riser tube has a bend 12, leading by way of a duct 13 through the side wall of the supply vessel outside the latter. The duct 13 can be opened or closed by a valve or gate which in the present example is a ball valve 14 having an operating lever 15. The lever 15 is biased to the closed position by, for example, a spring 16. A pressure actuated device diagrammatically shown as 17, connected to the feed duct for the carrier gas ($CO_2$) 11 by a connection which is not shown, holds the valve 14 open for as long as the carrier gas pressure in duct 11 prevails, against the bias of spring 16. However, once the pressure is turned off or seizes due to the gas bottle being empty, the spring 16 will automatically return the valve 14 to its closed position, thereby sealing off the supply vessel 1 from the continuation of the duct 13.

It will be understood that the valve means 14, 15, 16, 17 may be replaced by an electromagnetic valve device.

On the upwardly facing side of the bend 12, at the beginning of the bend, in the outer periphery thereof, and in axial alignment with the riser tube 8, an upwardly directed aperture 18 is provided. Aperture 18 may be of fixed size but is preferably adjustable by means of an adjustment gate 19, operable by an adjustment screw 20 passing through the top 6 of the supply vessel. Aperture 18 enters the gas space of the supply vessel, i.e. above the level of the bed of particulate material.

Figure 1A:
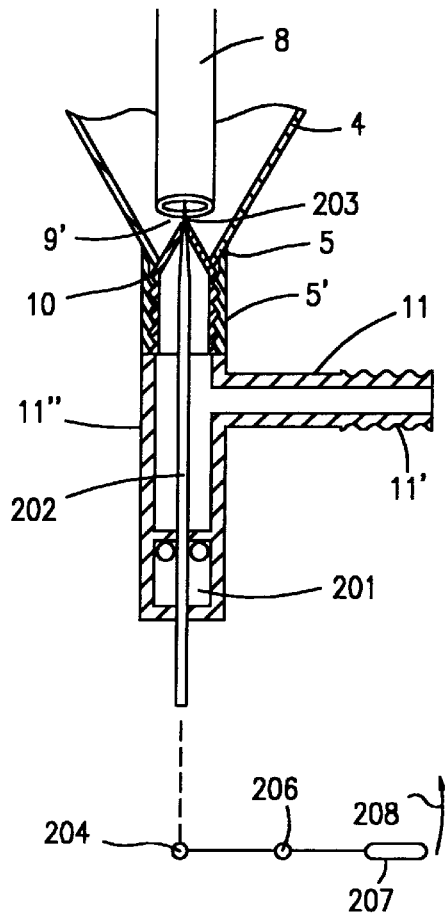
FIG. 1a represents a detail on a larger scale of the lower portion of an embodiment of the pneumatic feed device in region I a in FIG. 1.

As can be seen in FIG. 1a, as an alternative to apertures 9 in FIG. 1 at the lower end of the riser tube 8, that lower end terminates with a gap 9' between itself and the apex 5. The venturi nozzle 10 is formed by a screw threaded insert screwed into the bottom spigot 5' to which the gas supply tube 11 is connected. The gas supply tube 11 is represented by a gas hose connector nipple 11' entering sideways into the tubular member 11" welded at one end in axial alignment to the bottom spigot 5'. The opposite end terminates in a sliding seal 201 through which passes a needle valve needle 202, the tip 203 of which, in the closed position, as shown in the drawing, passes through and closes the venturi nozzle 10. This serves three purposes: to clear the nozzle of any blockages, to prevent solid particles from entering the nozzle and the tubular member 11" and closing the nozzle 10 in a substantially gastight manner even if gas pressure were to be admitted through the nipple 11'. The far end of the needle 202 is pivotally connected, diagrammatically shown at 204, to an operating lever 205, pivotally supported at 206 and having an operating handle 207. Movement of the handle in the direction of arrow 208 causes the withdrawal of the needle tip from the nozzle 10 and opening of the needle valve.

Optionally the manual lever may be replaced by a pneumatically or electromagnetically operating mechanism which may optionally be programmed to operate automatically.

As a powder feeding apparatus the apparatus 1 operates as follows:

An amount of free-flowing particulate material, a powder or granulate, is charged into the supply vessel 3 through the inlet 7. The inlet is appropriately closed in sealing relationship after the powder has been introduced, for example up to a level 21. The carrier gas supply is then opened to admit gas pressure to the carrier gas duct 11 and the device 17 which causes the valve 14 to open. Gas now enters from the gas feed duct 11 through the nozzle 10 and into the riser tube 18 as indicated by the arrows. The venturi effect of the nozzle 10 causes particulate material to be drawn into the riser tube 8 through the apertures 9 to be entrained in the riser tube and carried upwards. If the aperture 18 were to be completely closed, all the entrained particulate material would be carried through the bend and through the duct 13. However, depending on the amount by which the aperture is opened by the operation of the slide gate 19 a portion of the particulate material will be flung by its momentum in the axial direction of the riser tube through the aperture 18 and from there will drop back into the supply vessel 3. By adjustment of the gate 19 the ratio of particulate material proceeding through the duct 13 and that which is returned to the supply vessel can be adjusted at will resulting in a very accurate setting up of a desired feed rate for the particulate material through the duct 13, without necessarily changing the feed rate of the gas.

As soon as the supply of pressure to the carrier gas feed duct 11 is discontinued either voluntarily or by the gas supply running empty, the pressure drop will cause the device 17 to discontinue its push against the lever 15 of the ball valve 14 and the bias of the spring 16 will automatically cause the ball valve 14 to close. The effect of this is that the contents of the supply vessel 3 are completely sealed off from the outside. If, for example, the particulate material is a metal phosphide powder or granulate, e.g. magnesium phosphide, no humidity can enter the vessel 3 from the outside and the magnesium phosphide remains completely protected against atmospheric hydrolysis.

If the apparatus is equipped with a needle valve 10, 202, as shown in FIG. 1a, that needle valve is normally kept closed when the feeder device 1 is not in operation. The needle valve is opened prior to the admission of gas pressure to the gas supply duct 11. If the carrier gas is inert to the particulate material and the particulate material is to be kept under an inert atmosphere, the needle valve is opened prior to introducing the particulate material in order to flush the supply vessel 3 with inert gas admitted through the gas supply duct 11.

Dealing now with the righthand side of FIG. 1 the generator vessel 2 comprises a closed vessel 22 wherein a supply of water 23 is maintained up to a level 24 by supplying water through water supply spigot 25 up to the level 24 which is dictated by the water overflow device 26 which includes a drainage tube 27 leading from near the bottom of the vessel 22 to a pipe bend 28 leading horizontally outside through the side wall of the vessel 22 at a level which determines the water level 24 and leading into a downwardly directed drainpipe 29. In order to prevent the device from acting as a siphon and causing drainage of the vessel down to the bottom end of the drainpipe 29, an upwardly directed vent pipe 30 is provided on the pipe bend 28.

On the lefthand side of the vessel 22 a vertical powder feed pipe 31, connected to the duct 13, enters through the top of the vessel 22 for admitting powder advanced by the feed apparatus into the vessel 22.

An upwardly directed extension of the pipe provides a cleaning aperture 32, which is normally closed by means not shown. On the righthand side of the top of the vessel 22 as shown in the drawing, a gas outlet pipe 33 passes from the top of the vessel 22 through a droplet separator 34 into an outlet duct 35 through which the gas mixture generated in the generator is forwarded to wherever the gas is required, e.g. a silo, the contents of which are to be fumigated.

A pipe nipple 36 on the droplet separator 34 serves for the withdrawal of gas samples for analysis.

A further pipe nipple 37 on the righthand side of the top of the vessel 22 leads to a pressure monitoring device (not shown).

The gas space 38, 39 above the water surface 24 in the top part of the vessel 22 is subdivided into two chambers 38 and 39 by a vertical partition 40 extending from the top of the vessel down to the water surface and physically separates the entry for the metal phosphide powder supplied by ducts 31, 13 from the exit region for the generated gas through the duct 33. In the bottom of the vessel 22 underneath the chamber 38, that is to say the region where the metal phosphide is introduced, an inlet duct 41 for carrier gas, preferably $CO_2$ is provided, through which gas is bubbled into and through the water 23 for purposes of agitation. Also in the bottom of the vessel 22, at its lowest point, a valve controlled water and sludge drainage spigot 42 is provided.

The apparatus functions as follows. Before the start of phosphine generation $CO_2$ is bubbled through the duct 41 to displace any air from the apparatus. Once this has happened feeding of particulate metal phosphide material, preferably very pure magnesium phosphide may commence from the feed device 1 through the duct 13, 31 into chamber 38 from where the magnesium phosphide particles drop into the water 23 and are almost instantly hydrolysed. Agitation by the continued admission of $CO_2$ through duct 41 continues and further $CO_2$ is admitted to the vessel 22 through the duct 31 together with the magnesium phosphide powder. The resultant mixture of phosphine generated in the vessel and carbon dioxide admitted through ducts 31, 41 is so regulated that a desired ratio of phosphine to carbon dioxide accumulates in chamber 39 and is discharged through the outlet means 33, 34, 35. Because the hydrolysis of metal phosphides is highly exothermal, the temperature of the water 23 is kept below a predetermined level, e.g. 45° C. by the continued admission of cool water through the water inlet 25, causing the overflow of displaced warm water and sludge resulting from the hydrolysis of the magnesium phosphide to be drained off through the overflow 27, 28, 29.

This water and sludge, composed initially of magnesium hydroxide which then, due to reaction with the carbon dioxide bubbling through the water, is largely or wholly converted into magnesium carbonate, represents no environmental or disposal problem. Also, because of the low solubility of phosphine in water, the amount of phosphine lost with the water overflowing at 26 through system 27, 28, 29 is low.

If water is scarce, the overflowing water and sludge may be drained into a clarifying vessel, from where water, after the sludge has largely settled out, may be returned through a cooling system back to the water feed spigot 25.

Figure 2:
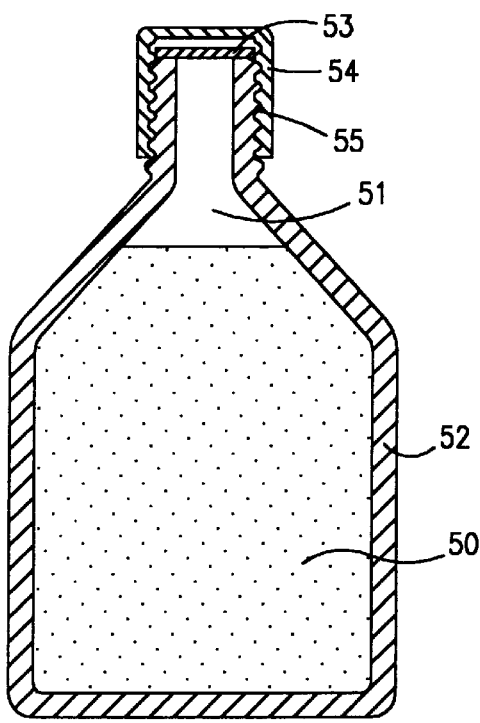
FIG. 2 represents a diagrammatic vertical section through a gastight dispenser container containing a metal phosphide composition in accordance with the invention.

Referring now to FIG. 2 of the drawings, there is shown a metal phosphide composition according to the invention 50 in an atmosphere 51 of the carrier gas $CO_2$ sealed in a gastight dispenser container in the form of an aluminium flask 52 of a size sufficiently large to hold a standardised quantity of the free-flowing magnesium phosphide composition 50. For example there may be provided different sizes of flasks holding, for example amounts of 1 kg, 2 kg and 5 kg respectively of the metal phosphide composition. The mouth of the flask is sealed with a gastight seal of aluminium foil 53 which is protected by a screw cap 54 screwed onto the threaded neck 55 of the flask.

It will be seen that the side walls of the flask 52 taper towards the neck 55 in a configuration which forms a funnel when the flask is positioned upside down.

Figure 3:
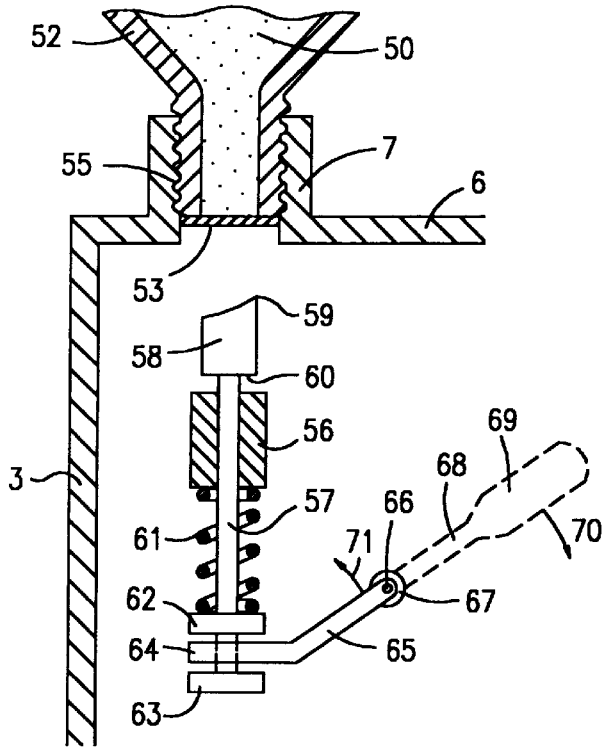
FIG. 3 a detailed view of the container in accordance with FIG. 2 fitted to the inlet of a modification of the apparatus in accordance with FIG. 1 showing the piercing mechanism for piercing the seal of the container.

Referring now to FIG. 3 of the drawings, the screw threaded neck 55 of the flask 52 matches the internal thread and size of the inlet spigot 7 in the top 6 of the supply vessel 3 of the apparatus shown in FIG. 1. In FIG. 3 the flask 52 is shown screwed tightly into the spigot 7 at a stage when the seal 53 is still intact. Inside the supply vessel there is mounted a seal perforating device, by the operation of which the seal 53 may be cut open. It includes a bush 56 in which is slidably mounted a plunger 57 carrying at its far end, upwardly directed and facing the seal 53, a punch bit 58 having sharp edges 59 similar to the punch bits of an office paper punch. In its retracted position of rest, the shoulder 60 rests on the upper edge of the bush 56, being biased into that position by a spring 61 between the lower edge of the bush 56 and a flange 62 near the bottom end of the plunger 57. Between the flange 62 and a second flange 63 slightly lower down, the plunger 57 is engaged by the prongs of a fork-shaped end 64 of a lever arm 65 mounted irrotationally on a horizontal shaft 66 passing through the side wall of the supply vessel 3 in pivotal and sealing relationship, provided by a bush 67. On the outside of the supply vessel 3 a second lever arm 68, terminating in a handle 69 is irrotationally mounted on the shaft 66. Operation of the lever 68, 69 in the direction of the arrow 70 causes upward swinging of the lever arm 65 in the direction of arrow 71 thereby moving the plunger 57 with its plunger bit 58 upwardly against the bias of the spring 61 causing the sharp edge 59 to punch a neat hole through the seal 53 as closely as possible to the inner periphery of the neck 55. Subsequent withdrawal of the plunger from the hole cut into the seal frees the mouth of the flask 52 and the free-flowing powder 50 then runs into the supply vessel 3. In this manner the contents of the flask 52 are transferred into the supply vessel 3 without any atmospheric humidity having an opportunity to enter into contact with the metal phosphide powder 50, the supply vessel 3 having previously been flushed out with carbon dioxide. The dimensions and design are so chosen that the punched out disk cannot interfere with the operation of the apparatus, e.g. by blocking the apertures 9. The apparatus is now ready for use. Once the contents of the flask 52 have been consumed, and if more metal phosphide is needed, the flask 52 may be screwed off, and a further flask may be screwed in place with a slight positive carbon dioxide pressure prevailing in the supply vessel so that no moisture can enter from the atmosphere. The seal is then again punched open.

If the phosphine gas which is extremely pure is to be used for semi-conductor doping, argon can be used as a carrier gas instead of $CO_2$.

Figure 4:
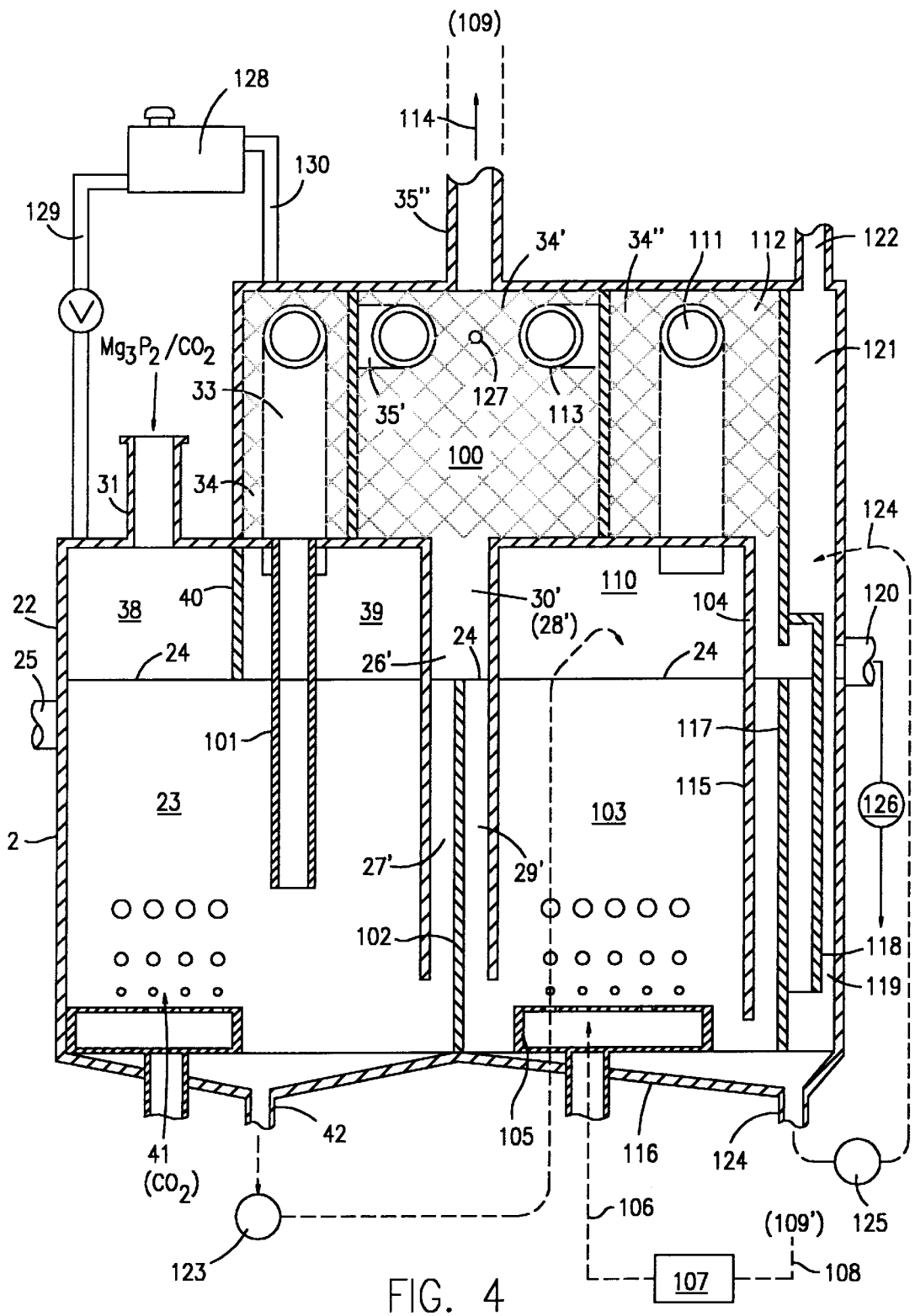
FIG. 4 represents a diagrammatic view similar to that in FIG. 1 of a further embodiment of a phosphine generator according to the invention, without the feeder device.

Referring now to FIG. 4 of the drawings (from which the feeder device', identical to that of FIG. 1, has been omitted in order to avoid overcrowding of the drawing), the reference numbers are used as in FIG. 1 to indicate substantially identical integers. These will not be described all over again.

The main difference resides in that the gas outlet pipe 33 leading from the gas space 39 above the water level 24 of the hydrolysis chamber 22 and the droplet separation chamber containing water disentrainment means 34 (any suitable packing for that purpose) is adjoined by and communicates with a gas mixing chamber 100 through a duct 35'. The mixing chamber is likewise packed with a water disentrainment packing 34'. The water collected in the packing 34 drains back into the water bath 23 through a draining pipe 101 extending well below the water level 24.

Any water collected in the mixing chamber 100, drains into a cavity 26' extending from the mixing chamber to near the bottom of the hydrolysis chamber 22 and separating in conjunction with an overflow weir 102 the water bath 23 from the water 103 in the aerating chamber 104. The overflow weir 102 extends up to the water level 24 and divides the cavity 26' into water inflow cavity 27' and outflow cavity 29' which communicate above the overflow weir 102 through the overflow and venting chamber 30' (28').

At the bottom of the aerating chamber 104 an air distributor and bubbling device 105 is provided, connected to a source of air formed by an air duct 106, an air blower 107 and an air suction duct 108 connected to a fumigation space (109). An air space 110 above the water 103 in the aerating chamber discharges thereabove through a discharge duct 111 into a disentrainment chamber 112, containing a droplet separator packing 34" and communicating with the gas mixing chamber 100 through an air passage 113. The mixing chamber has a gas mixture outlet 35" connected by a feed duct 114 to the fumigation space (109) not shown as such.

The aerating vessel 104 on its side opposite the overflow weir 102 and associated walls 27' and 29' is bordered by a similar overflow structure. This is formed by a wall 115 extending from the top of air chamber 110 down to near the bottom 116 of the aerating chamber, an overflow weir 117 and an overflow passage 118 leading into an outlet chamber 119 and outlet duct 120. The top of the outlet chamber 119 forms an air space 121 with a vent duct 122.

The bottom of the hydrolysis chamber 22 slopes towards a drainage spigot 42 connected to a drainage pump 123. Likewise the bottom of the aerating chamber 104 slopes towards a draining spigot 124 connected to a drainage pump 125. The outlet duct 120 is connected to a drainage pump 126.

It should be understood that a single pump combined with an appropriate set of valves could be used instead of three separate pumps 123, 124 and 126. However, the combination of these pumps lends itself to particularly easy automatic pre-programmed operation. 128 represents a feed tank for cleaning fluid (HCl) which is introduced at the end of a generating cycle (or after 10 kg of magnesium phosphide have been consumed). Its contents are discharged through a hose 129 into the generator chamber 22 to assist the cleaning water to wash out solid precipitates of magnesium carbonate. 130 is a pressure equalisation hose.

It should be understood that the air blower 107 can also be employed to apply recirculation of the mixture of phosphine and air and/or other diluent gas (e.g. $CO_2$) through a heaped bulk commodity (e.g. a particulate agricultural or forestry commodity) contained in the fumigating space (e.g. a silo or shiphold), e.g. in the manner known from the above-cited prior art.

Finally, reference must be made to the important safety feature of a thermal switch 127 in the mixing chamber connected to switch off the supply of metal phosphide to the hydrolysis chamber from the feed device (1) and thereby, within seconds interrupting the supply of further phosphine in the event of an excessive temperature (more than 100° C.) in the mixing chamber indicating fire or fire risk.

Figure 5:
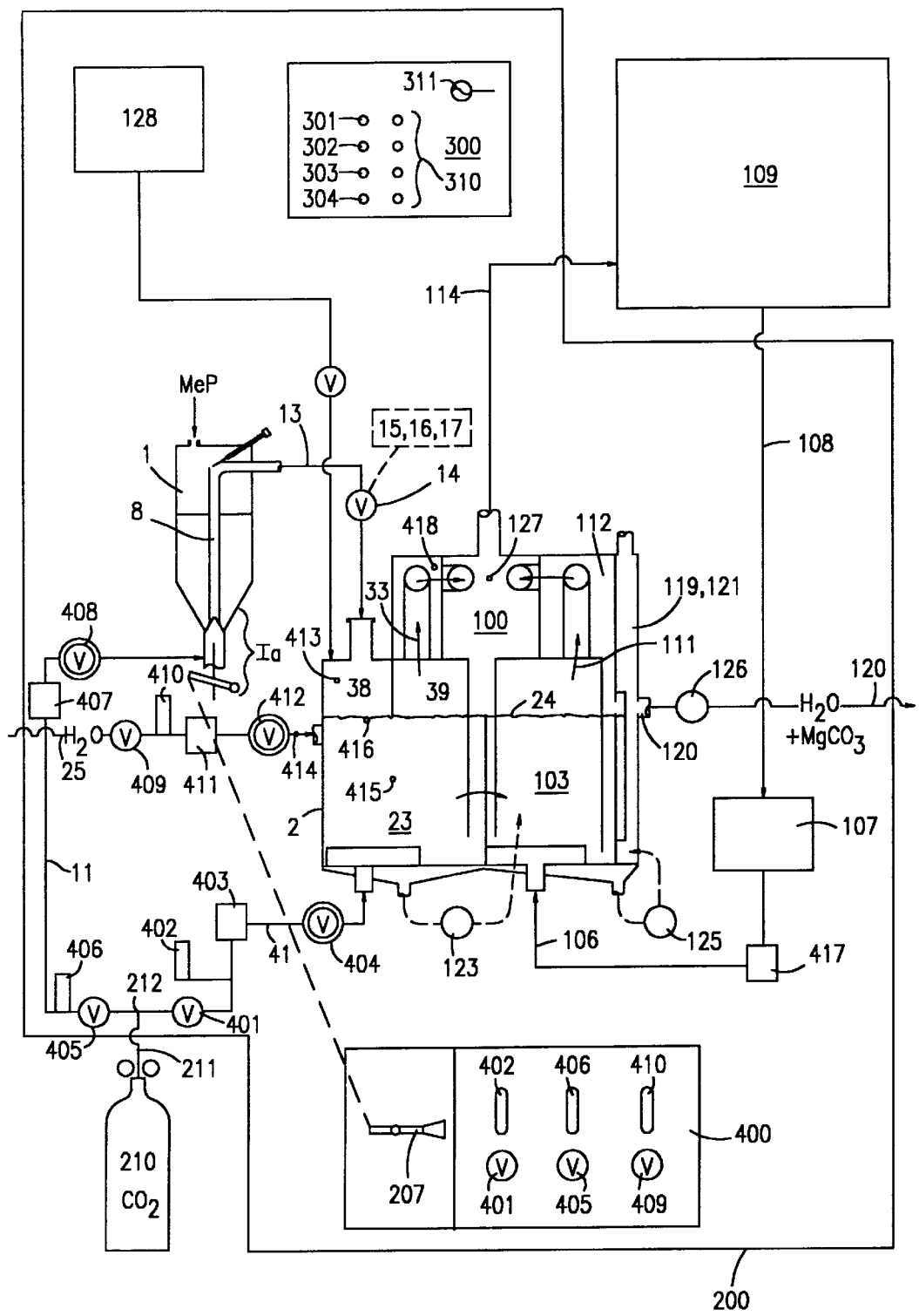
FIG. 5 represents a block diagram of the flow paths and control means of the apparatus in accordance with FIG. 4.

Referring now also to FIG. 5, there is shown diagrammatically the apparatus in accordance with FIG. 4 and its control means within the confines of a cabinet, diagrammatically indicated by the outlines 200. The apparatus is connected on the inlet side to a carbon dioxide bottle 210. Likewise, water feed pipe 25 is connected to an outside source of fresh water, not shown. The space to be fumigated is diagrammatically shown by block-shaped outlines 109. The waste water outlet 120 leads to a drain or collecting vessel outside the apparatus. The cabinet has an electronic mode control panel 300 with four control buttons, a start button 301, a pause button 302, a restart button 303 and a washing mode button 304, each one adjoined by a pilot light 310 to indicate the particular operating mode which has been set. A general on/off switch is diagrammatically indicated as set 311. Further, there is diagrammatically indicated a manual and visual flow control panel 400 on which is mounted the control lever 207 in accordance with FIG. 1a and which includes manual flow regulating valves 401, 405 and 409 each associated with a visual flow indicator 402, 406 and 410 respectively. The functions of these will be explained in what follows.

The $CO_2$ bottle 210 is connected by a gas hose 211 to a manifold 212, one arm of which leads into the $CO_2$ inlet duct 41, leading into the gas bubbling device at the bottom of the generator chamber 23. This duct includes the manual control valve 401 and the visual flow indicator 402 on the panel 400, an electronic flow monitor 403 and an electronically controlled regulator valve 404.

The other branch of the manifold 212 leads into the propellant gas duct 11 of the pneumatic feed device 1. Duct 11 includes the manual regulator valve 405 and visual flow indicator 406 of panel 400, an electronic flow monitor 407 and an electronically controlled regulator valve 408.

The fresh water inlet 25 feeding water into the generator chamber 23 includes a manual flow control valve 409 and visual flow rate indicator 410 on panel 400 and an electronic flow monitor 411 and electronically controlled regulator flow valve 412. It furthermore optionally includes a fresh water temperature gauge 414, which serves for information only and has no control function.

Likewise, the wall temperature gauge 413 in the top part 38 of the generator vessel is purely for information purposes as is the water temperature gauge 415 inside the water bath of the generator chamber 23. On the other hand, the water level monitor 416 in the generator chamber is connected to the automatic electronic control means of the apparatus for automatic corrective action in the event of the water level 24 deviating The flow rate of air in the air duct 106, leading into the aerating chamber 103 of the generator, drawn through duct 108 from the fumigation space 109 by the blower 107 is automatically electronically monitored by the gas flow rate monitor 417. A further electronic gas flow rate monitor 418 is provided in the duct 33 leading from the generator gas space 39 into the water disentrainment chamber preceding the mixing chamber 100.

Apart from the few manual control means mentioned further above, the apparatus is programmed to operate fully automatically and the operator need only press the appropriate button on the panel 300. First the start button 301 is operated. This causes the water, $CO_2$ and air feeds and water pump 126 to be switched on. If the electronic monitoring means indicate that all four critical parameters are in order, the apparatus runs for about seven minutes as a prepreparationary period, until the correct water level 24 has been attained. If in this respect any operational fault is detected, the apparatus is switched automatically to "pause" mode and an alarm is sounded. If everything is in order, the electronically controlled valves for $CO_2$ and magnesium phosphide are opened in the course of a period of about thirty seconds. After one further minute the feed control valves for $CO_2$ in the duct 11 of the metal phosphide feed device 1 are operated and metal phosphide is now propelled at the desired controlled rate through the riser tube 8, duct 13 and valve 14 into the gas chamber 38 of generator vessel 23 and drops into the water, whereby the generation of phosphine gas commences.

The process can be interrupted at will by pressing the "pause" button 302, to be restarted if desired by pressing the "restart" button 303.

After a preprogrammed dosage period has expired, the $CO_2$ valves and the electronically controlled valves for $CO_2$ and metal phosphide are automatically closed and the washing phase commences. For the washing phase the vessel 128 at a preprogrammed stage receives an appropriate volume of hydrochloric acid which is admitted to the generator space 23 where it mixes with washing water which is withdrawn by pump 123 and forwarded into the aerating chamber 103 from where in turn it is forwarded by pump 125 into the outlet chamber 119, 121 from where it is finally withdrawn by pump 126 and discharged through duct 120.

The washing programme can also be started at will by pressing the "washing" button 304.

The complete programme is diagrammatically illustrated in the diagram of FIG. 6. In that diagram the horizontally shaded transverse columns represent monitoring and the cross-hatched transverse columns represent material feeding periods.

The vertical columns represent the following:

A: starting up period
B: metal phosphide feeding
C: washing
D: final rinsing

The sub-headings of the vertical columns (t) represent the times in minutes for the various product phases (where x is variable).

On the left hand side of the diagram the headings for the transverse columns have the following meaning:

I: $CO_2$ admission through duct 41
II: $CO_2$ admission through duct 11
III: fresh water admission through duct 25
IV: air circulation through duct 106
V: admission of hydrochloric acid (HCl)
VI: pump 126
VII: pumps 123 and 125
VIII: maintenance of water level 24
IX: temperature monitoring at 127 (max 100° C.)

After numerous tests it was concluded that the apparatus can be operated conveniently and safely with $CO_2$ and metal phosphide (MeP) flow rates being adjusted to result in a ratio of phosphine to $CO_2$ of 59:41 v/v. In fact, no problems were experienced with a ratio as high as 75:25 v/v. In the mixing chamber 100 dilution with air was carried out to a concentration of 18000 ppm $PH_3$. The tests were performed with magnesium phosphide of 95% w/w purity produced as described in the Example.

Aluminium phosphide can be used if the temperature of the water bath is preferably at least 60% and if 5% HCl is added.

EXAMPLE OF METAL PHOSPHIDE USED IN THE PROCESS

Magnesium phosphide for use in the process and generator was produced by the method in accordance with U.S. Pat. Nos. 4,331,642 and 4,412,979 at a temperature between 450 and 550° C., great care being taken that nowhere in the reactor a temperature of 550° C. was exceeded. Extremely pure magnesium powder having a particle size ranging from 0.1 to 2 mm was employed as the starting material and the resulting magnesium phosphide formed in the reactor in the form of a granulate having the same particle size. This granulate, after having been discharged from the reactor, was maintained at 550° C. for a further 1 hour to cause residual traces of unconverted phosphorus to be converted as well. In contrast to the prior art procedure the resultant granulate was not impregnated with paraffin wax or with any other hydrophobic substance. No additives were incorporated in this very pure magnesium phosphide powder except for an admixture of 0.3% graphite powder to improve the free-flowing properties.

Testing of the magnesium phosphide so produced revealed none of the usual contaminants which give rise to autoigniting phosphorus compounds in the phosphine gas when the powder is subjected to hydrolysis.

The claims which follow and the priority document are part of the present disclosure.

What we claim is:

1. A process for generating a mixture of phosphine and diluent gas or gases, wherein a hydrolysable metal phosphide selected from the group consisting of magnesium phosphide, aluminum phosphide and calcium phosphide is contacted with liquid water in a generating space, whereby the metal phosphide is hydrolysed to release phosphine which is withdrawn from the generating space and is, in the event that the phosphine withdrawn from the generating space has an ignitable composition, diluted from the time of its generation to its reaching its locality of use with a diluent gas to a composition which is non-ignitable under the conditions of use, wherein the metal phosphide is released into the liquid water in a free-flowing particulate form, composed of loose metal phosphide particles predominantly in a particle size range of about 0.1 mm to 2.5 mm, essentially free of metal phosphide dust substantially smaller than 0.1 mm and of hydrolysis retarding agents and essentially free of hydrophobic substance in the form of coatings or hydrophobising additives, and, in the event that dilution commences already in the generating space, under an atmosphere comprising a carrier gas inert to the phosphine, forming at least part of the diluent gas.

2. The process as claimed in claim 1, wherein dilution commences already in the generating space and the carrier gas inert to the phosphine is also inert to the metal phosphide and the metal phosphide is maintained in an atmosphere of said carrier gas before entering the water.

3. The process as claimed in claim 1, wherein the metal phosphide is essentially free of impurities giving rise to autoignition, including impurities which on hydrolysis in the process liberate autoignitable phosphine homologues, phosphine derivatives, organophosphines, diphosphine or polyphosphines.

4. The process as claimed in claim 1, wherein the temperature of the water is monitored and maintained within a predetermined temperature range.

5. The process as claimed in claim 1, wherein the metal phosphide entering the water is hydrolysed in less than 3 minutes.

6. The process as claimed in claim 5, wherein the metal phosphide entering the water is hydrolysed in less than 1 minute.

7. The process as claimed in claim 1, wherein the metal phosphide powder of the composition, after having been discharged from its packaging container, is entrained in the carrier gas and thus entrained, is carried into the generator space and there enters into the water.

8. The process as claimed in claim 1, wherein the water is agitated with carrier gas.

9. The process as claimed in claim 1, wherein the phosphine gas or mixture of phosphine gas and gas inert to phosphine withdrawn from the generator space is mixed with air in a ratio of phosphine to air below the ignition limit of phosphine in a mixing space isolated from the environment and upstream of a feed duct for the mixture.

10. The process as claimed in claim 9, wherein the mixing space is temperature monitored.

11. The process as claimed in claim 9, wherein water from the generator space is withdrawn and forwarded into an aerating space and air is bubbled through the water in the aerating space and from there is forwarded into the mixing space and mixed there with the phosphine gas or, in the event that the phosphine gas has an ignitable composition mixed with the mixture of phosphine gas and the carrier gas inert to phosphine to form a non-ignitable mixture.

12. The process as claimed in claim 9, wherein the air is withdrawn from a closed fumigation space wherein fumigation is to take place and the resulting non-ignitable gas mixture is fed into the fumigation space.

13. The process as claimed in claim 2, wherein the carrier gas is $CO_2$.

14. The process as claimed in claim 1, wherein the mixture of phosphine and diluent gas is introduced into a fumigating space containing a commodity to be fumigated with phosphine.

15. The process as claimed in claim 14, wherein the gas in the fumigating space including the mixture is recirculated.

16. The process as claimed in claim 1, wherein the mixture of phosphine and carrier gas is used in semiconductor doping.

17. The process as claimed in claim 16, wherein the carrier gas is argon.

18. The process as claimed in claim 1, wherein the metal phosphide is admitted into the liquid water in the generating space via an inlet and the phosphine is withdrawn from the generating space via a gas outlet, the metal phosphide being fed via a feed means through the inlet at a controlled rate.

19. The process as claimed in claim 1, wherein the carrier gas is introduced into the generating space via an inlet, the inlet being connected to a supply of the carrier gas.

20. The process as claimed in claim 18, wherein the feed means is operated in a gas atmosphere which is inert to the metal phosphide and the phosphine gas.

21. The process as claimed in claim 18, wherein the particulate metal phosphide is pneumatically entrained by the diluent gas, which serves as a carrier and propellant gas, via a pneumatic entrainment device included in the feed means.

22. The process as claimed in claim 21, wherein the particulate metal phosphide is entrained from a receptacle, included in the pneumatic entrainment device, by the carrier gas introduced via a gas inlet which leads to a venturi device and carried through a powder forwarding duct and into the liquid water in the generating space.

23. The process as claimed in claim 22, wherein a rate of the particulate metal phosphide entrained from the feed means is regulated in the powder forwarding duct.

24. The process as claimed in claim 10, wherein the supply of gas to the mixing space is automatically interrupted in response to an excessive temperature in the mixing space.

25. A process for generating a mixture of phosphine gas and diluent gas or gases, comprising:

feeding a hydrolyzable metal phosphide, selected from the group consisting of magnesium phosphide, aluminum phosphide and calcium phosphide, in particulate form into aqueous liquor in a generating space;

hydrolyzing the metal phosphide to phosphine gas predominantly within seconds and completely within less than 3 minutes from a time of entering the aqueous liquor;

withdrawing the phosphine gas from the generating space; and in the event that the phosphine gas has an ignitable composition, diluting the phosphine gas with a diluent gas to a composition which is non-ignitable under conditions of use.

26. A process as claimed in claim 25, wherein diluting the phosphine gas with the diluent gas commences in the generating space and the metal phosphide is maintained, before entering the aqueous liquor, in an atmosphere of carrier gas which is inert to the phosphine gas and also inert to the metal phosphide, the carrier gas forming at least part of the diluent gas.

27. A process as claimed in claim 25, wherein the metal phosphide is essentially free of impurities giving rise to autoignition, including impurities which on hydrolysis in the process liberate autoignitable phosphine homologues, phosphine derivatives, organophosphines, diphosphine or polyphosphines.

28. A process as claimed in claim 25, wherein the temperature of the aqueous liquor is monitored and maintained within a predetermined temperature range.

29. A process as claimed in claim 25, wherein the metal phosphide entering the aqueous liquor is hydrolysed in less than 1 minute.

30. A process as claimed in claim 26, wherein the metal phosphide in particulate form, after having been discharged from a packaging container in which it has been packaged, is entrained in the carrier gas and thus entrained, is carried into the generating space and there enters into the aqueous liquor.

31. A process as claimed in claim 26, wherein the aqueous liquor is agitated with the carrier gas.

32. A process as claimed in claim 26, wherein the diluent gas includes air and the phosphine gas or mixture of phosphine gas and carrier gas inert thereto that is withdrawn from the generating space is mixed with the air in a mixing space isolated from the environment and upstream of a feed duct for the mixture.

33. A process as claimed in claim 32, wherein the mixing space is temperature monitored.

34. A process as claimed in claim 32, wherein aqueous liquor from the generating space is withdrawn and forwarded into an aerating space, and air is bubbled through the aqueous liquor in the aerating space and from there is forwarded into the mixing space and mixed there with the mixture of phosphine gas and the carrier gas inert to the phosphine gas, thereby to form the composition which is non-ignitable under conditions of use.

35. A process as claimed in claim 32, wherein the air is withdrawn from a closed fumigation space and a resulting composition which is non-ignitable under conditions of use is fed into the fumigation space.

36. A process as claimed in claim 26, wherein the carrier gas is $CO_2$.

37. A process as claimed in claim 25, wherein the composition of phosphine gas and diluent gas is introduced into a fumigating space containing a commodity to be fumigated with phosphine.

38. A process as claimed in claim 37, wherein the gas in the fumigating space, including the composition of phosphine gas and diluent gas, is recirculated.

39. A process as claimed in claim 26, wherein the composition of phosphine gas and diluent gas is used in semiconductor doping.

40. A process as claimed in claim 39, wherein the carrier gas which forms at least part of the diluent gas is argon.

41. A process as claimed in claim 25, wherein the metal phosphide is admitted into the aqueous liquor in the generating space via an inlet and the phosphine gas is withdrawn from the generating space via a gas outlet, the metal phosphide being fed via a feed means through the inlet at a controlled rate.

42. A process as claimed in claim 26, wherein the carrier gas is introduced into the generating space via an inlet, the inlet being connected to a supply of the carrier gas.

43. A process as claimed in claim 41, wherein the feed means is operated in a gas atmosphere which is inert to the metal phosphide and the phosphine gas.

44. A process as claimed in claim 41, wherein the metal phosphide in particulate form is pneumatically entrained by the diluent gas, which serves as a carrier and propellant gas, via a pneumatic entrainment device included in the feed means.

45. A process as claimed in claim 44, wherein the metal phosphide in particulate form is entrained from a receptacle, included in the pneumatic entrainment device, by the carrier gas introduced via a gas inlet which leads to a venturi device, and carried through a powder forwarding duct and into the aqueous liquor in the generating space.

46. A process as claimed in claim 45, wherein a rate of the metal phosphide in particulate form entrained in and from the feed means is regulated in the powder forwarding duct.

47. A process as claimed in claim 33, wherein the supply of gas to the mixing space is automatically interrupted in response to an excessive temperature in the mixing space.

* * * * *